May 15, 1945.  R. M. EVANS  2,376,132
COLORED PHOTOGRAPHIC MASK
Filed Oct. 3, 1941  2 Sheets-Sheet 1

Ralph M. Evans
INVENTOR

BY
ATTORNEYS

May 15, 1945.　　　R. M. EVANS　　　2,376,132
COLORED PHOTOGRAPHIC MASK
Filed Oct. 3, 1941　　2 Sheets-Sheet 2

YELLOW MASK

ORANGE MASK

YELLOW MASK

YELLOW MASK

YELLOW NEGATIVE MASK
COLOR CORRECTED TRANSPARENCY

Ralph M. Evans
INVENTOR
BY
ATTORNEYS

Patented May 15, 1945

2,376,132

UNITED STATES PATENT OFFICE 2,376,132

COLORED PHOTOGRAPHIC MASK

Ralph M. Evans, Rochester, N. Y., assignor to Eastman Kodak Company, Rochester, N. Y., a corporation of New Jersey Application October 3, 1941, Serial No. 413,442

7 Claims. (Cl. 95—2)

This invention relates to color correction masks, and in particular to colored negative masks, for use in photography for printing color corrected pictures.

In printing from multicolor originals which consist in whole or in part of dyes, the fact that the light absorption of each of the dyes usually covers the whole spectrum rather than being confined to one part of the spectrum makes it impossible to obtain printed records of the individual dyes simply by restricting the color of the printing light. Since in most three-color photographic processes the three dyes are not equally bad with respect undesired absorption, the final result of printing such a film is to introduce unequal parts of all three records in each image which is made, regardless of the color of light used in printing or the sensitivity of the photographic materials used.

The general principles of masking a positive original in three colors, with a negative image in black and white to overcome the above defects is well known, having been described in Evans U. S. Patent 2,203,653, granted June 4, 1940, and Hanson U. S. Patent 2,294,981, granted September 8, 1942 and elsewhere.

The disadvantages of the prior art methods of using negative silver masking images for color correction, are due to several circumstances. First of all, there is a tendency toward graininess in using silver masking images. Also, since it is absolutely necessary that the masking image be used in register with the colored original image, it is difficult, especially in the case of the color correction of miniature color films, to obtain accurate registration. In addition, silver masking images have a tendency to affect definition in color corrected prints. Similarly, since prior art methods employing silver masking images ordinarily require that the contrast of all three records in a final print be raised in the final printing process, this contributes to graininess or mottle in the final image. Also, since silver masking images absorb in the infra red region, this contributes to heating of the original film during the printing process, with the concomitant danger of destroying the original picture.

The object of the present invention is to provide a method for color correction devoid of the disadvantages of the prior art methods.

The objects of the invention are accomplished by preparation of a colored negative mask absorbing light of the wave lengths which one or more of the subtractive dye images of a colored original are intended to transmit but which are absorbed, and using this mask to make color corrected prints from an original.

In the accompanying drawings

Figs. 5, 6, 7, and 8 illustrate by partial section, various methods for forming negative colored masks in the manner of the present invention.

Figure 9:
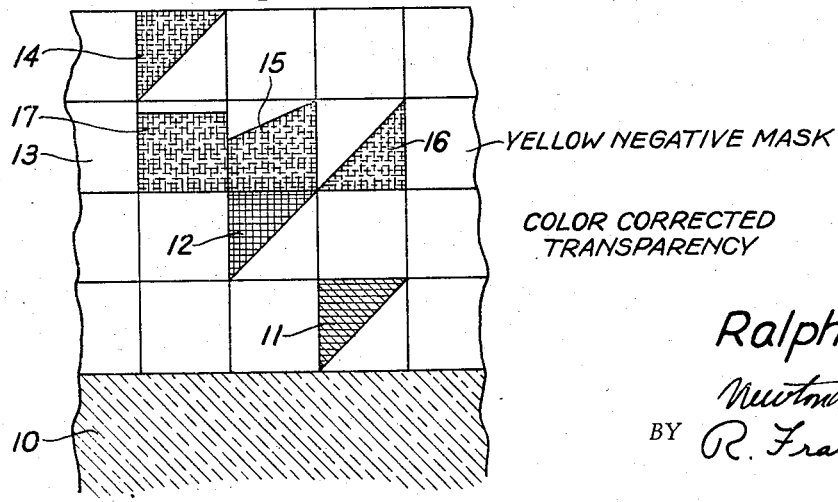

Fig. 9 is a partial cross-sectional view of a subtractive color film having superposed subtractive dye images and a colored negative mask between the upper layers.

The invention will now be described with particular reference to the accompanying drawings.

Figure 1:
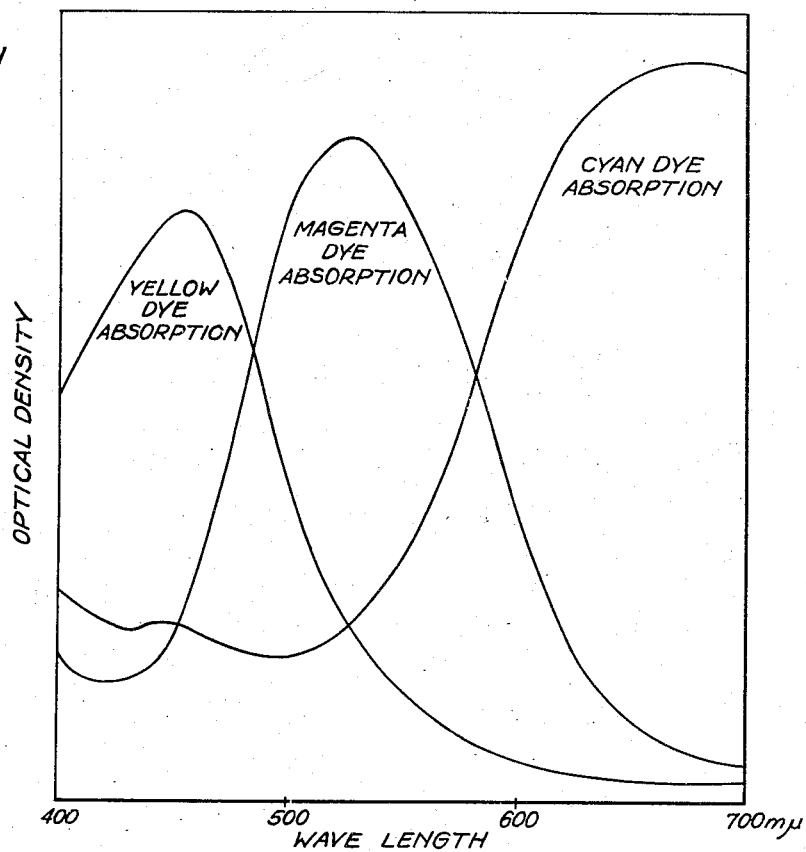
Fig. 1 is a graph showing the absorption curves of representative dyes used in subtractive color processes.

Fig. 1 shows the absorption curves, that is, the optical densities of typical subtractive dyes cyan, magenta and yellow plotted against the wave lengths of the spectrum, and it is dye images having these characteristics with which the present invention is concerned. Coupling agents forming dyes having such characteristics have been disclosed in the following patents; Mannes et al. U. S. 2,089,730 granted May 5, 1936, 2,108,603 granted February 5, 1938, and 2,115,394 granted April 26, 1938. However, the dye images in a color transparency which is to be color corrected in the manner of the invention, may have different absorptions than those shown in the figure, for instance, the magenta dye absorption in the red region of the spectrum may be higher than that shown. From the figure, it may be seen that the yellow dye absorption is principally in the blue region, and, although there is some absorption in the green region, since the absorptions of the magenta and cyan dyes in regions other than those which they are intended to absorb is so much greater, it is generally not considered necessary to introduce any correction in masking processes for the false absorption of the yellow dye. The cyan and magenta dyes have absorptions in the blue region of the spectrum, the cyan dye has absorptions in the green region of the spectrum and the magenta dye has absorption in the red region of the spectrum, in addition to absorption in normal regions. In the figure it is assumed that the relative concentrations of the dyes are adjusted so that when the three dyes are superposed, a neutral gray is produced.

Figure 2:
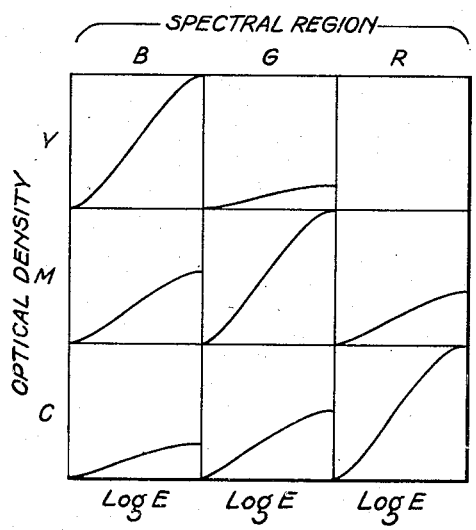
Fig. 2 is a graphical representation of the relative absorptions of representative subtractive dyes obtained by plotting the log of the exposure against the optical density in various regions of the spectrum.

In order to facilitate description of the invention the absorptions of the dyes in the various regions of the spectrum is illustrated by means of graphs as shown in Fig. 2. The separate graphs of the figure indicate the absorption gamma of a given dye in a region of the spectrum. For instance, graphs YB, MG and CR, represent the absorption gamma of the dyes in the normal regions of absorption. The remaining graphs represent absorption gammas in the regions of the spectrum other than those which the dyes are intended to have absorption.

By "absorption gamma" is meant the H and D curve of a dye image as read by light of a given spectral region.

Thus, when dye images having the characteristics illustrated in Figs. 1 and 2 of the drawings are duplicated by normal procedures which reproduce neutral images correctly, there will be a loss in saturation of colors represented by the individual dyes. This is due to the fact that during a duplication process in which a given neutral unit of density is reproduced correctly the cyan dye would be reproduced by itself by the amount of cyan corresponding to its red density, an amount of magenta corresponding to its green density, and an amount of yellow corresponding to its blue density. Similarly the magenta dye by itself would be reproduced by an amount of magenta dye corresponding to its green density, and amounts of cyan and yellow dyes corresponding to its blue and red densities. The yellow dye, having density principally in the blue region, is reproduced only by yellow corresponding to its blue density. It is, therefore, apparent that there will be a loss in saturation for all colors except pure yellow.

For a single dye image this tendency toward incorrect reproduction may be compensated for, somewhat, by increasing the gamma in the duplicating process to give a nearly correct reproduction of the original dye saturation. However, it is necessary to use different gammas and exposures for duplicating correctly each combination of any of the dyes in the original. Since the colored mask decreases contrast of the original in some or all regions of the same color as the mask, the color gamma of the final printing process must be raised. If the gamma of one of the records of the original is incorrect, the color of the mask may be so adjusted that it compensates for this defect.

By the use of a correct single negative mask, such as a silver mask, in contact with the original, this result can be obtained at a single exposure. If the mask is exposed with the proper light and is developed correctly, the neutral density which it contributes to a color will be just the amount required to adjust the exposure of that color so that reproduction will be achieved at a single exposure. This process has been disclosed in the Hanson U. S. Patent 2,294,981.

Figure 3:
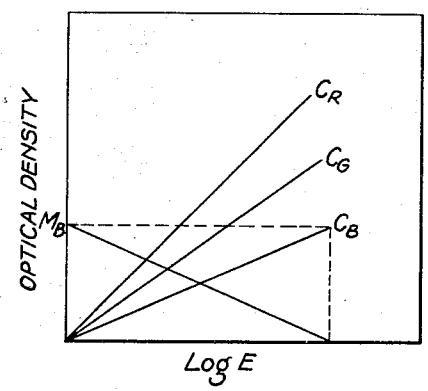
Fig. 3 is a graphical representation of a method for correcting a color transparency for absorption of one of its dye images in a region of the spectrum other than that which it is intended to absorb.

When a subtractively colored original transparency is color corrected by means of a negative mask, such as a silver mask, or a colored mask in the manner of the present invention, this process may be represented as shown in Figure 3. Here, the absorption gamma of a dye such as a cyan dye, in the various regions of the spectrum is represented by the slopes $C_R$, $C_G$, and $C_B$. When a negative mask is exposed and developed to the proper gamma so as to compensate for the absorption of the cyan dye in the blue, represented by slope $C_B$, it functions as represented by the slope $M_B$. Similarly, the cyan dye image may be corrected for absorption of green. This process, insofar as a silver masking image is concerned, is essentially that which is described by the prior art cited.

The object of the mask then is to effectively eliminate the absorption in regions where they should not occur.

Thus by using a mask obtained by the prior art methods cited, and duplicating in a process having the correct gamma, faithful reproductions of a color transparency may be obtained. However, the colored mask of the present invention has none of the disadvantages and some of the advantages of the silver mask, as previously enumerated.

Figure 4:
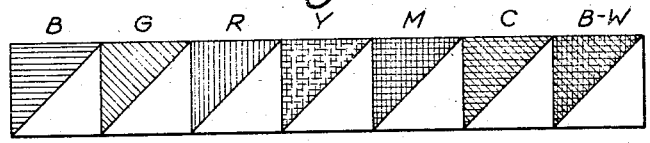
Fig. 4 represents the range of tones from the pure color to white of several different colors in a subtractive color transparency.
Figure 5:
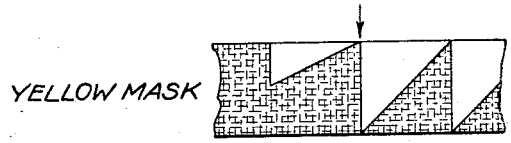

In the present invention a colored mask is formed in a negative aspect in respect to the transparency, that is, the mask is the negative if the transparency is a positive, and vice versa, and accomplishes the results of the prior art methods without the disadvantages. According to my method, a transparency appearing as shown in Fig. 4, that is, containing dye images having a wide range of tones from the pure color to white, indicated by the shaded areas B for blue, G for green, etc., is used for exposing a mask in the manner of my invention. First, a light-sensitive layer such as a panchromatic film, is placed in contact with the transparency illustrated in Fig. 4. The sensitive film is then exposed through the transparency in such a manner that when the mask is suitably colored and placed in register with the transparency, its spectral absorptions at every point of the image combined with the undesired absorptions of the given set of dyes to light absorbed by the mask, are equal to a fixed value. Thereafter, the sensitive layer is developed and suitably colored in the region of the original exposure. The conditions are obviously set by the maximum impurity present in the image (usually by the maximum blue absorption of the cyan image). Thus, if it is desired to correct a cyan image principally for its false absorption of blue light, the mask may be exposed with red light passing through the transparency, and then colored yellow in the region of the exposure and the silver removed. This may be accomplished by developing the film with a color-forming developer, the oxidation product of the developing compound combining with a color-former to form a yellow dye image. A suitable developer for the purpose, and bleach solution for removing silver images after color development, may be one such as disclosed in Mannes and Godowsky U. S. Patent No. 2,252,718 granted October 19, 1941. Other yellow couplers which are suitable are disclosed in Mannes et al. U. S. 2,108,602 granted Feb. 15, 1938. A partial section of the mask prepared as above described appears as shown in Fig. 5 of the accompanying drawings. Since the absorption gamma of the cyan dye for red, graph CR, as shown in Fig. 2, is considerably greater than that of magenta for red, graph MR, and if the yellow mask was developed to the same but opposite gamma as the gamma of the impurity in the cyan dye image, when the mask is in register the blue light absorption at every point of the yellow masking image combined with the blue absorption of the cyan dye image is equal to a fixed value. Since the gamma of the magenta image in the transparency is small compared to that of the cyan for red, the area in the yellow mask corresponding to exposure through the magenta area of the transparency is of such low gamma that relatively little correction would be obtained for the blue absorption of the magenta dye. Since the colored mask absorbs principally in the blue regions it decreases the contrast of an image as seen by blue light. Therefore, it is necessary to raise the contrast of the yellow image to a considerable extent in the final process.

If it is desired to correct a transparency for incorrect absorption of cyan dye images in the green region as well as the blue region, such as would be the case with images having absorptions similar to dyes shown in Fig. 1, the mask may be exposed with red light, and, instead of developing the negative image to yellow, a color-former developer may be used which develops an orange image. The following developer solution is suitable for this purpose:

*Solution A*

| 2-amino-5-diethylamino toluene hydrochlochloride | gram | 1 |
| Sodium sulfite | do | 1 |
| Potassium thiocyanate | do | 1 |
| Water to | cc | 990 |

*Solution B*

| Acetoacet-p-nitro-anilide | grams | 3 |
| Sodium hydroxide | do | 1 |
| Water to | cc | 10 |

(Solution B is added to Solution A.)

Figure 6:

The mask appears as shown in Fig. 6 of the accompanying drawings. If the mask has been properly exposed and colored, its blue and green absorptions at every point of the image combined with the blue and green absorptions of the cyan dye image will be equal to a fixed value. When a print is made by exposing through the transparency and the mask in register, the cyan will be rendered faithfully. Since the mask does not have appreciable absorption in the red and considerably less in the green, it does not decrease the contrast of the image as seen by red light, it decreases the image contrast by blue light considerably, and by green light to an intermediate extent. Therefore, to compensate for this effect it is necessary to raise the contrast of the yellow image of the final printing process to a considerable extent, the magenta less, and the cyan not at all.

Figure 7:

If it is desired to principally correct the magenta image in a subtractive color film, for absorption in the blue region of the spectrum, the mask may be exposed with green light and colored yellow. In this case, since the absorption gamma of the magenta image for green is considerably greater than that of the cyan image for green, graphs MG and CG, Fig. 2, relatively little correction will be introduced into the mask for any defects in absorption of the cyan image. A mask of the above type is illustrated in Fig. 7 of the accompanying drawings.

Figure 8:

In a similar manner if it is desired to correct the magenta and cyan dye images in a color transparency as shown in Figure 8, the mask may be exposed with suitable substantially monochromatic light such as disclosed in the above mentioned Hanson Patent 2,294,981, and colored yellow with a suitable color forming developer, then correction would be obtained for the blue absorption of the magenta and cyan dye images.

Up to this point in the description of my invention, it may appear that masking images would be formed only on separate light-sensitive layers and then combined with a color transparency in register in order to print a color-corrected image. This is not true, as may be seen by consideration of Fig. 9 of the accompanying drawings. The figure represents a partial sectional view of a color film having superposed subtractively colored dye images 14, 12 and 11, colored yellow, magenta and cyan, respectively carried on a support 10 of a cellulose ester or other similar material, and between the outer layers a yellow negative mask. The latent masking image having been formed in the interlayer in a manner similar to that described in the Mannes et al. U. S. Patent No. 2,258,187, granted October 7, 1941 or in an outer layer as described in Evans U. S. Patent 2,253,070 granted August 19, 1941. In that process after the formation of subtractive color images in the superposed layers, a separate layer containing silver is rehalogenized and the masking image printed therein by exposure through the bottom layers. In the manner of my invention this process may be extended by developing the latent masking image in a color forming developer and then removing the silver image as above described. If the masking exposure has been made with red light and the mask colored yellow, the masking images appear substantially as shown in Fig. 9, areas 15, 16 and 17. The masking image then corrects the cyan dye for absorption in the blue region of the spectrum, but gives little correction for the absorption of the magenta dye in that region since the absorption gamma of the magenta dye image, to the light used in exposing the mask, was low. The yellow image 17 in register with the yellow dye image 14 would, of course, have no contrast effect. Alternately, the mask may be colored orange, or, exposed with green or yellow light and colored yellow.

The advantages of using a colored mask instead of a black-and-white mask in color correction processes is now apparent. First of all, the graininess of such a mask is much less than that of a silver mask, since each clump of silver passes a considerable portion of the spectrum and accordingly has low contrast. Also, since the contrast of yellow or orange is visually low, lack of registry between the mask and the picture is less objectionable. Also, since the mask controls the printing of the yellow or yellow and magenta bands, rather than all three, it has less effect on the definition of the final picture, when, for instance, the mask is out of register. Another advantage is that, since the contrast of the cyan record is not changed, and the magenta contrast is either not affected (yellow mask) or affected to only an intermediate extent (orange mask), it is not necessary to raise the contrast of all three records in the final print. This is frequently an advantage, as for example, when increased contrast increases the graininess or mottle of the final image. Also if the contrast increase is restricted to the yellow record (yellow mask), the printing operation is less critical to exposure and color balance than if all three images are raised. Finally, a color mask does not increase the density of an original in the region of the spectrum that it does not absorb such as the infra red region. This decreases heating of the original during printing operations.

My invention is subject to other variations, as for instance, instead of using the color development method for forming colored images after exposure of the masking layer, I may employ any suitable method for coloring the layer in the region of the exposure, such as, coloring by hand for partial correction.

If it is desired to introduce correction simultaneously for the false absorptions of the dyes in the final print, as well as the false absorptions of the dyes in the original transparency, this may be done by over-compensating in the mask for the impurity of the printing dyes.

It is to be understood that the disclosure herein is by way of example and that I consider as included in my invention all modifications and equivalents falling within the scope of the appended claims.

What I claim is:

1. The method of forming a color-correction mask for a photographic color film having superposed dye images, at least one of which absorbs a major proportion of light in the spectral region of one of the primary colors and a minor proportion of light in at least one other region of the visible spectrum, which comprises exposing a light-sensitive silver halide emulsion layer to light passing through said color film and forming therein a colored image corresponding to at least one of said dye images having said minor absorption region, said colored image absorbing light in only said minor absorption region of said dye image, and having a gamma substantially equal but opposite to the gamma of said dye image when both are measured by light of the color of said minor absorption region.

2. The method of forming a color-correction mask for a photographic color film having superposed subtractive, including cyan, dye images, at least the cyan image of which absorbs a major proportion of light in the spectral region of one of the primary colors and a minor proportion of light in at least one other region of the visible spectrum, which comprises exposing a light-sensitive silver halide emulsion layer to red light passing through said color film and forming therein a colored image corresponding to at least one of said dye images having said minor absorption region, said colored image absorbing light in only said minor absorption region of said cyan dye image, and having a gamma substantially equal but opposite to the gamma of said dye image when both are measured by light of the color of said minor absorption region.

3. The method of forming a color-correction mask for a photographic color film having superposed subtractive, including cyan, dye images, at least the cyan image of which absorbs a major proportion of light in the spectral region of one of the primary colors and a minor proportion of light in at least one other region of the visible spectrum which comprises exposing a light-sensitive silver halide emulsion layer to red light passing through said color film and forming therein a yellow image corresponding to said cyan image, said yellow image absorbing light in only said minor absorption region of said cyan dye image, and having a gamma substantially equal but opposite to the gamma of said dye image when both are measured by light of the color of said minor absorption region.

4. The method of forming a color-correction mask for a photographic color film having superposed subtractive, including magenta, dye images, at least the magenta image of which absorbs a major proportion of light in the spectral region of one of the primary colors and a minor proportion of light in at least one other region of the visible sepctrum, which comprises exposing a light-sensitive silver halide emulsion layer to green light passing through said color film and forming therein a yellow image corresponding to said magenta image, said yellow image absorbing light in only said minor absorption region of said magenta dye image, and having a gamma substantially equal but opposite to the gamma of said dye image when both are measured by light of the color of said minor absorption region.

5. The method of forming a color-correction mask for a photographic color film having superposed cyan, magenta, and yellow dye images, the cyan and magenta images absorbing a major proportion of light in the red and green spectral regions, respectively, and a minor proportion of light in the blue spectral region, which comprises exposing a light-sensitive silver halide emulsion layer to yellow light passing through said color film and forming therein a yellow image corresponding to the cyan and magenta dye images, and having a gamma substantially equal but opposite to the gammas of said cyan and magenta dye images when both are measured by blue light.

6. The method of making a color-corrected photograph from a colored original transparency having superposed subtractive dye images, at least one of which absorbs a major proportion of light in the spectral region of one of the primary colors and a minor proportion of light in at least one other region of the visible spectrum, which comprises exposing a light-sensitive silver halide emulsion layer to light passing through said transparency and forming therein a colored image corresponding to at least one of said dye images having said minor absorption region, said colored image absorbing light in only said minor absorption region of said dye image, and having a gamma substantially equal but opposite to the gamma of said dye image when both are measured by light of the color of said minor absorption region, and printing a color-corrected photograph from the combination of said colored original and said colored image in registry.

7. The method of making a color-corrected photograph from a colored original transparency having superposed subtractive dye images, at least one of which absorbs a major proportion of light in the spectral region of one of the primary colors and a minor proportion of light in at least one other region of the visible spectrum, which comprises exposing a light-sensitive silver halide emulsion layer to light passing through said transparency, and forming therein a colored image corresponding to at least one of said dye images having said minor absorption region, said colored image absorbing light in only said minor absorption region of said dye image, and having a gamma substantially equal but opposite to the gamma of said dye image when both are measured by light of the color of said minor absorption region, and printing onto a sensitive photographic material having three superposed silver halide emulsion layers each sensitive to a different region of the visible spectrum, with white light, through a combination of said colored original and said colored image in registry.

RALPH M. EVANS.